US009886094B2

United States Patent
Wang et al.

(10) Patent No.: US 9,886,094 B2
(45) Date of Patent: Feb. 6, 2018

(54) LOW-LATENCY GESTURE DETECTION

(71) Applicant: Microsoft Technology Licensing, LLC, Redmond, WA (US)

(72) Inventors: Baoyuan Wang, Beijing (CN); Szymon Piotr Stachniak, Redmond, WA (US); Zhuowen Tu, San Diego, CA (US); Baining Guo, Bellevue, WA (US); Ke Deng, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 14/263,887

(22) Filed: Apr. 28, 2014

(65) Prior Publication Data

US 2015/0309579 A1   Oct. 29, 2015

(51) Int. Cl.
*G06F 3/01* (2006.01)
*G06T 1/20* (2006.01)
*G06K 9/00* (2006.01)
*G06K 9/46* (2006.01)
*G06K 9/62* (2006.01)

(52) U.S. Cl.
CPC ......... *G06F 3/017* (2013.01); *G06K 9/00335* (2013.01); *G06K 9/4676* (2013.01); *G06K 9/6256* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 6,304,674 B1* | 10/2001 | Cass et al. | ..................... | 382/224 |
| 9,019,381 B2* | 4/2015 | Guler et al. | .................. | 348/169 |
| 2009/0217211 A1* | 8/2009 | Hildreth et al. | ............. | 715/863 |
| 2011/0211754 A1* | 9/2011 | Litvak et al. | ................. | 382/165 |
| 2012/0239174 A1 | 9/2012 | Shotton et al. | | |
| 2013/0148940 A1* | 6/2013 | Schmit | ................. | G11B 27/005 386/230 |

(Continued)

OTHER PUBLICATIONS

Zanfir, Mihai et al. The Moving Pose: An Efficient 3D Kinematics Descriptor for Low-Latency Action Recognition and Detection. The IEEE International Conference on Computer Vision (ICCV), 2013, pp. 2752-2759.

(Continued)

*Primary Examiner* — Bryan Earles

(57) ABSTRACT

Low-latency gesture detection is described, for example, to compute a gesture class from a live stream of image frames of a user making a gesture, for example, as part of a natural user interface controlling a game system or other system. In examples, machine learning components are trained to learn gesture primitives and at test time, are able to detect gestures using the learned primitives, in a fast, accurate manner. For example, a gesture primitive is a latent (unobserved) variable features of a subset of frames from a sequence of frames depicting a gesture. For example, the subset of frames has many fewer frames than a sequence of frames depicting a complete gesture. In various examples gesture primitives are learnt from instance level features computed by aggregating frame level features to capture temporal structure. In examples frame level features comprise body position and body part articulation state features.

20 Claims, 12 Drawing Sheets

(56) References Cited

U.S. PATENT DOCUMENTS

| | | | | |
|---|---|---|---|---|
| 2013/0257720 A1* | 10/2013 | Noda | .................. | G06F 3/017 345/157 |
| 2013/0278501 A1* | 10/2013 | Bulzacki | .................. | G06F 3/017 345/157 |
| 2014/0347263 A1* | 11/2014 | Dai et al. | .................. | 345/156 |
| 2016/0328604 A1* | 11/2016 | Bulzacki | .................. | G06Q 50/00 |
| 2017/0046568 A1* | 2/2017 | Bulzacki | .................. | G06F 3/017 |

OTHER PUBLICATIONS

Wang, J. et al. "Locality-constrained Linear Coding for Image Classification" 2010 available at http://people.ee.duke.edu/~lcarin/cvpr2010_0618.pdf.

Ali, Saad and Shah, Mubarak. Human action recognition in videos using kinematic features and multiple instance learning. IEEE Trans. Pattern Anal. Mach. Intell., 32(2): 288-303, Feb. 2010.

Davis, JamesW. and Tyagi, Ambrish. Minimal-latency human action recognition using reliable-inference. Image Vision Comput., 24(5):455-472, May 2006.

Ellis, Chris, Masood, Syed Zain, Tappen, Marshall F., Laviola, Jr., Joseph J., and Sukthankar, Rahul. Exploring the trade-off between accuracy and observational latency in action recognition. Int. J. Comput. Vision, 101(3), Feb. 2013.

Hoai, Minh. Max-margin early event detectors. In Proceedings of the 2012 IEEE Conference on Computer Vision and Pattern Recognition (CVPR), CVPR'12, pp. 2863-2870, 2012.

Nowozin, Sebastian and Shotton, Jamie. Action points: A representation for low-latency online human action recognition. Technical Report MSR-TR-2012-68, Microsoft Research Cambridge, 7JJ Thomson Ave, CB30FB Cambridge, UK, Jul. 2012.

Ryoo, M. S. Human Activity Prediction: Early Recognition of Ongoing Activities from Streaming Videos. IEEE International Conference on Computer Vision (ICCV), Barcelona, Spain, Nov. 2011, 8 pages.

* cited by examiner

LOW-LATENCY GESTURE DETECTION

BACKGROUND

Gesture detection systems are increasingly used in natural user interfaces to interact with computing devices without the need for physical input devices such as keyboards, mice, stylus pens and the like and without the need to touch a screen. For example, game systems are available where a player is able to stand in front of a depth and color camera system which captures images of the player making gestures such as golf swings, dance moves, and hand gestures such as hand waving, pushing motions and pulling motions. Complex analysis of the captured images is computed to detect and recognize the gestures and the results are used to influence game play.

There is an ongoing need to improve the accuracy of gesture detection systems. There is also an ongoing need to develop gesture detection systems which have low observational latency. Here latency means the number of frames that a gesture detection system consumes before recognizing an underlying gesture depicted in those frames. Existing gesture detection systems typically have a relatively high observational latency which makes the natural user interface harder to use by the game player or other end user. Where observational latency is high errors may result in use of the natural user interface. For example, conflicting inputs may be made to a game or other system where gesture recognition input is delayed and becomes conflicted with other forms of user input made without delay. Where natural user interface technology is used for medical applications, for example, to control robotic equipment for surgery or other applications requiring fine grained control, it is especially important to reduce observational latency with regard to gesture detection.

The embodiments described below are not limited to implementations which solve any or all of the disadvantages of known gesture detection systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Low-latency gesture detection is described, for example, to compute a gesture class from a live stream of image frames of a user making a gesture, for example, as part of a natural user interface controlling a game system or other system. In examples, machine learning components are trained to learn gesture primitives and at test time, are able to detect gestures using the learned primitives, in a fast, accurate manner. For example, a gesture primitive is a latent (unobserved) variable describing features of a subset of frames from a sequence of frames depicting a gesture. For example, the subset of frames has many fewer frames than a sequence of frames depicting a complete gesture. In various examples gesture primitives are learnt from instance level features computed by aggregating frame level features to capture temporal structure. In examples frame level features comprise body position and body part articulation state features.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer game system, the system described is provided as an example and not a limitation. As those skilled in the art will appreciate, the present examples are suitable for application in a variety of different types of computing and image processing systems.

In various examples a practical online (real time) gesture detector with high accuracy and low observational latency is described. Here latency means the number of frames that the gesture recognition system needs to consume before recognizing the underlying gesture. It's generally important to provide users instant feedback for any natural user interaction application. For example, in a typical fighting gaming scenario, the avatar needs to detect the potential users' punch or kick gestures as early as possible so as to provide according reactions. Similarly, for natural user interface controls such as drag and drop and window resizing, latency and accuracy are the important factors that measure the interactive performance.

As mentioned above, gesture primitives are learnt by a machine learning component and these learnt gesture primitives enable gestures to be recognized more quickly than previously possible, and also with good accuracy. This is because previous approaches have learnt complete gesture sequences rather than trying to learn sub-patterns within those long gesture sequences. The gesture primitives of the examples described herein are sub-patterns of gestures and so may be detected without using data observed from a complete sequence of frames depicting a whole gesture. In the examples described below the sub-patterns are unobserved variables which are learnt during a training phase. During a test phase, when the trained machine learning system is used to recognize gestures, it is possible to recognize gestures from a relatively small number of frames, as compared with the number of frames depicting the complete gesture. In this way latency is reduced.

Some previous approaches have attempted to learn global level discriminative gesture patterns without taking into account localized gesture sub-patterns. The examples described herein have been found to give a better tradeoff between accuracy and latency than previous approaches. This is especially the case when the gestures contain relatively large intra-class variability (for example, golf swings and sign language gestures).

Figure 1:
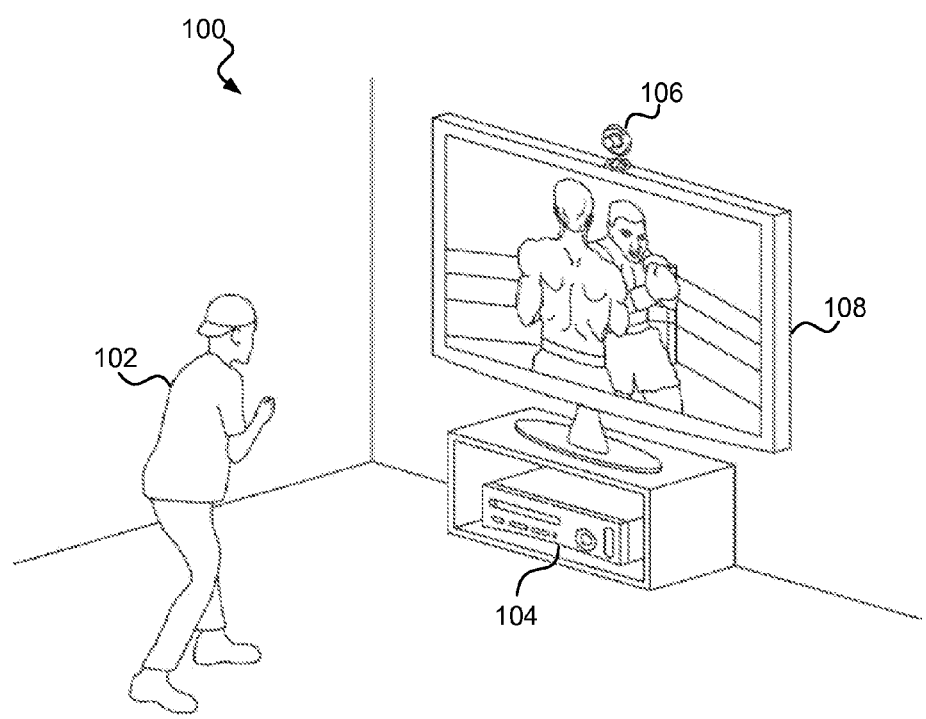
FIG. 1 illustrates an example camera-based control system for controlling a computer game.

FIG. 1 shows an example camera-based control system 100 for controlling a computer game. FIG. 1 shows a user 102 playing, in this illustrative example, a boxing game. In some examples, camera-based control system 100 can be used to, among other things, determine body pose, bind, recognize, analyze, track, associate to a human target, provide feedback, interpret gestures, and/or adapt to aspects of a human target such as the user 102.

The camera-based control system 100 comprises a computing device 104. The computing device 104 can be a general purpose computer, gaming system or console, or dedicated image processing device. The computing device 104 can include hardware components and/or software components such that the computing device 104 can be used to execute applications such as gaming applications and/or non-gaming applications. The structure of the computing device 104 is discussed hereinafter with reference to FIG. 12.

The camera-based control system 100 further comprises a capture device 106. The capture device 106 can be, for example, an image sensor or detector that can be used to visually monitor one or more users (such user 102) such that gestures performed by the one or more users can be captured, analyzed, processed, and tracked to perform one or more controls or actions within a game or application, as described in more detail below.

The camera-based control system 100 can further comprise a display device 108 connected to the computing device 104. The computing device can be a television, a monitor, a high-definition television (HDTV), or the like that can provide game or application visuals (and optionally audio) to the user 102.

In operation, the user 102 can be tracked using the capture device 106 such that the joint positions, movements and size of user 102 can be interpreted by the computing device 104 (and/or the capture device 106) as controls that can be used to affect the application being executed by computing device 104. As a result, the user 102 can move his or her body to control an executed game or application.

In the illustrative example of FIG. 1, the application executing on the computing device 104 is a boxing game that the user 102 is playing. In this example, the computing device 104 controls the display device 108 to provide a visual representation of a boxing opponent to the user 102. The computing device 104 also controls the display device 108 to provide a visual representation of a user avatar that the user 102 can control with his or her movements. For example, the user 102 can throw a punch in physical space to cause the user avatar to throw a punch in game space. Thus, according to this example, the computing device 104 and the capture device 106 of the camera-based control system 100 can be used to recognize and analyze the punch of the user 102 in physical space such that the punch may be interpreted as a game control of the user avatar in game space.

Furthermore, some movements can be interpreted as controls that correspond to actions other than controlling the avatar. For example, the user can use movements to enter, exit, turn system on or off, pause, save a game, select a level, profile or menu, view high scores, communicate with a friend, etc. Additionally, movement of the user 102 can be used and analyzed in any suitable manner to interact with applications other than games, for example to enter text, select icons or menu items, control media playback, browse websites or operate any other controllable aspect of an operating system or application.

In the example of FIG. 1 the capture device 106 is mounted on top of a display screen. However, it is also possible for the capture device 106 to be worn by the user. For example, as a wrist mounted device, head mounted device or other wearable device.

Figure 2:
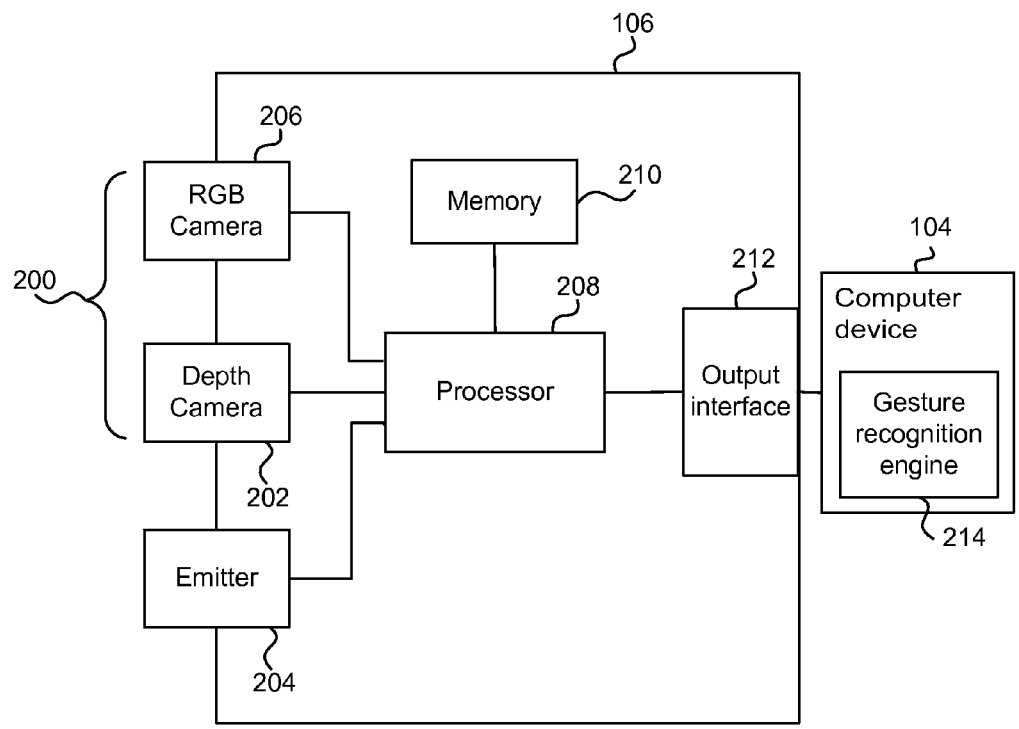
FIG. 2 is a schematic diagram of an image capture device.

Reference is now made to FIG. 2, which illustrates a schematic diagram of the capture device 106 that can be used in the camera-based control system 100 of FIG. 1. In the example of FIG. 2 the capture device 106 is configured to capture video images with depth information. Such a capture device can be referred to as a depth camera. The depth information can be in the form of a depth image that includes depth values, i.e. a value associated with each image element of the depth image that is related to the distance between the depth camera and an item or object located at that image element.

The depth information can be obtained using any suitable technique including, for example, time-of-flight, structured light, stereo image, or the like. In some examples, the capture device 106 can organize the depth information into "Z layers," or layers that may be perpendicular to a Z-axis extending from the depth camera along its line of sight.

As shown in FIG. 2, the capture device 106 comprises at least one imaging sensor 200. In the example shown in FIG. 2, the imaging sensor 200 comprises a depth camera 202 arranged to capture a depth image of a scene. The captured depth image can include a two-dimensional (2-D) area of the captured scene where each image element in the 2-D area represents a depth value such as a length or distance of an object in the captured scene from the depth camera 202.

The capture device can also include an emitter 204 arranged to illuminate the scene in such a manner that depth information can be ascertained by the depth camera 202. For example, in the case that the depth camera 202 is an infra-red (IR) time-of-flight camera, the emitter 204 emits IR light onto the scene, and the depth camera 202 is arranged to detect backscattered light from the surface of one or more targets and objects in the scene. In some examples, pulsed infrared light can be emitted from the emitter 204 such that the time between an outgoing light pulse and a corresponding incoming light pulse can be detected by the depth camera and measured and used to determine a physical distance from the capture device 106 to a position on the targets or objects in the scene. Additionally, in some examples, the phase of the outgoing light wave from the emitter 204 can be compared to the phase of the incoming light wave at the depth camera 202 to determine a phase shift. The phase shift can then be used to determine a physical distance from the capture device 106 to a position on the targets or objects. In a further example, time-of-flight analysis can be used to indirectly determine a physical distance from the capture device 106 to a position on the targets or objects by analysing the intensity of the reflected beam of light over time via various techniques including, for example, shuttered light pulse imaging.

In another example, the capture device 106 can use structured light to capture depth information. In such a technique, patterned light (e.g., light displayed as a known pattern such as grid pattern or a stripe pattern) can be projected onto the scene using the emitter 204. Upon striking the surface of one or more targets or objects in the scene, the pattern becomes deformed. Such a deformation of the pattern can be captured by the depth camera 202 and then be analysed to determine a physical distance from the capture device 106 to a position on the targets or objects in the scene.

In another example, the depth camera 202 can be in the form of two or more physically separated cameras that view a scene from different angles, such that visual stereo data is obtained that can be resolved to generate depth information. In this case the emitter 204 can be used to illuminate the scene or can be omitted.

In some examples, in addition to the depth camera 202, the capture device 106 can comprise a regular video camera, which is referred to as an RGB camera 206. The RGB camera 206 is arranged to capture sequences of images of the scene at visible light frequencies, and can hence provide images that can be used to augment the depth images. In alternative examples, the RGB camera 206 can be used instead of the depth camera 202.

The capture device 106 shown in FIG. 2 further comprises at least one processor 208, which is in communication with the imaging sensor 200 (i.e. depth camera 202 and RGB camera 206 in the example of FIG. 2) and the emitter 204. The processor 208 can be a general purpose microprocessor, or a specialized signal/image processor. The processor 208 is arranged to execute instructions to control the imaging sensor 200 and emitter 204 to capture depth images and/or RGB images. The processor 208 can also optionally be arranged to perform processing on these images, as outlined in more detail hereinafter.

In some examples the imaging sensor is used to provide silhouette images which are two dimensional binary images identifying foreground and background regions of the depth and/or RGB images captured by the imaging sensor. The silhouette images may be formed at the imaging sensor and/or processor 208 from the captured depth and RGB images. The silhouette images may be processed using the methods described herein to predict two dimensional joint positions. In this case the silhouette images can be thought of as depth images flattened to a fixed depth. The captured depth images may be used to predict three dimensional joint positions as described in more detail below.

The capture device 106 shown in FIG. 2 further includes a memory 210 arranged to store the instructions that for execution by the processor 208, images or frames of images captured by the depth camera 202 or RGB camera 206, or any other suitable information, images, or the like. In some examples, the memory 210 can include random access memory (RAM), read only memory (ROM), cache, Flash memory, a hard disk, or any other suitable storage component. The memory 210 can be a separate component in communication with the processor 208 or integrated into the processor 208.

The capture device 106 also comprises an output interface 212 in communication with the processor 208 and is arranged to provide data to the computing device 104 via a communication link. The communication link can be, for example, a wired connection (such as USB, Firewire™, Ethernet™ or similar) and/or a wireless connection (such as WiFi, Bluetooth™ or similar). In other examples, the output interface 212 can interface with one or more communication networks (such as the internet) and provide data to the computing device 104 via these networks. The computer device 104 comprises a gesture recognition engine 214 which is described in more detail below with reference to FIG. 3.

The gesture recognition engine 214 receives input from capture device 106 comprising a depth image stream 300 and an optional RGB image stream 302. The gesture recognition engine 214 may also receive as input optional state data about the state of the game 304 and optional sensor data 306 such as from environmental sensors measuring temperature, light levels, noise levels, or other sensed data.

The gesture recognition engine comprises a body position engine 308, a body part articulation state detector 310, filter banks 312, a sparse coder 314, an instance level representation engine 318 and a trained classifier 322. These components are computer implemented using software and/or hardware. That is, the functionality of the gesture recognition engine described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The body position engine 308 computes, body position data (with associated uncertainty) such as joint position data, body part centroid position data, or other 3D position data associated with an articulated entity depicted in the depth image stream and/or the RGB image stream. The articulated entity may be for example, a human, an animal, part of a human, part of an animal, or a robotic or other articulated entity. In some examples the 3D position data comprises 6 degree of freedom position data. In some examples the 3D position data comprises 6 degree of freedom position data and the direction of a surface normal of a surface of the animated entity associated with the position.

In an example the body position engine comprises a joint position detection system as described in U.S. patent application Ser. No. 13/050,858 entitled "Predicting joint positions" filed on 17 Mar. 2011 and published on 20 Sep. 2012 with publication number 20120239174. However, this is an example only. The body position engine may use a body part centroids position detection system or other system for calculating position of parts or joints of an animated entity.

In some examples the body position engine comprises a finger tip position detector. For example, the capture device may be worn on a wrist of a user and may detect finger and thumb tip positions. In some examples the body position engine comprises a finger tip position detector comprising a stereo camera mounted so as to capture images of an interaction space.

The body part articulation state detector computes a state label from a plurality of possible state labels. The state label may have associated uncertainty information. For example, the body part articulation state detector may be a hand state detector which computes a label for a hand depicted in one or more image frames. Example labels may be open palm up, open palm down, closed, vertical palm away. In other examples the body part articulation state detector is a head state detector which computes a state for a head depicted in one or more image frames. Example labels may be head down, head up, head turned left. The body part articulation state detector may be a facial expression detector in some examples.

Data computed by either or both of the body position engine 308 and the body part articulation state detector 310 are optionally processed by filter banks 312 and a sparse coder 314. This produces frame level features 316. That is, a plurality of features are computed for individual ones of the stream of image frames.

The filter banks act to remove noise and outlier values from the outputs of the body position engine and body part state detector. This may improve robustness of the gesture recognition engine. The sparse coder 314 acts to transform the original filter bank output vector into another vector in a new but higher dimensional feature space through codebook learning and coding optimization. This may reduce the negative effect of the noisy data and build a robust feature representation.

The frame level features are input to the instance level representation engine 318. An instance is a plurality of frames from a sequence of frames that may depict, somewhere within the sequence, an example of a gesture. A sequence of frames that are known to depict an example of a gesture is called a positive bag in this document. A sequence of frames that are known not to depict an example of a gesture of a particular class (or known not to depict any gesture) is called a negative bag in this document. An instance has fewer frames than a sequence of frames depicting a complete gesture.

For example, a positive bag comprising a sequence of 50 frames may contain a depiction of a golf swing gesture. Instances may be computed from the positive bag by selecting ordered frames from the bag. For example, an instance may be computed by selecting every other frame. In another example, an instance may be computed by selecting the middle 20 frames. In another example, an instance may be computed by selecting frames 3, 4, 5, 22, 39, 40, 41 from the sequence of 50 frames. There are a large number of overlapping instances in each positive bag. There are also a large number of overlapping instances in each negative bag. Ideally such negative instances could be any combination of frames within the negative bag.

Instances which are likely to occur only in positive bags and which are unlikely to occur in negative bags are called gesture primitives in this document. A gesture primitive is a plurality of frames from a sequence of frames, or features computed from the plurality of frames, which may be used to indicate whether the sequence of frames depicts a gesture or not. A gesture primitive is a latent (unobserved) variable to be learnt by the classifier 322 of the gesture recognition engine during a training phase. That is, a gesture primitive cannot be labeled by a human being analyzing a sequence of frames. A gesture primitive describes characteristics of fewer frames than the total number of frames depicting a complete gesture.

As explained above an instance is a plurality of frames from a sequence of frames that may depict an example gesture. The instance level representation engine computes instance features 320 which are characteristics of individual instances. Thus an instance feature comprises information aggregated from a plurality of frames selected from a sequence of frames.

In an example, the aggregation comprises temporal aggregation. This is referred to as temporal pooling and is described in more detail below with reference to FIG. 9. Various different types of temporal pooling may be used such as max pooling and average pooling. In general, temporal pooling has been found to be very effective especially for short gestures with simple underlying patterns such as using your hand to push away from you.

In another example, the aggregation comprises computing a graphical representation to depict temporal structure of an individual instance. For example, by computing a hidden conditional random field. The graphical representation may be adaptive in that inference is carried out to infer hidden variables of the conditional random field using dynamic programming at both training time (when the classifier 322 is trained) and at test time (when the trained classifier is used to detect gestures). In general, graphical representations of temporal structure have been found to be very effective especially for long complex gestures such as golf swings.

The instance features 320 computed by the instance level representation engine are input to a trained classifier 322 which outputs a gesture label 324 and associated uncertainty information. Any suitable trained classifier may be used. For example, a linear classifier. In an example, a multiple decision boundary classifier is used. A multiple decision boundary classifier acts to divide a feature space into regions using two or more boundaries. Examples are then classified into regions according to which region they fall into in the feature space. A multiple decision boundary classifier has been found to be particularly effective as the instance level features capture dramatic differences in appearance, motion, and shape.

During online operation of the gesture recognition engine live streams of input images are processed to calculate gesture labels 324 in real time. For example, the streams of input images are received at a frame rate of a video camera and are processed to calculate gesture labels at the same rate. The stream of frames is analyzed as it is received and the gesture recognition engine fires a gesture as soon as it receives instance level features with high confidence of being a gesture primitive. The instance level features may result from only a few frames of a gesture. In this way, the operation at test time is particularly fast and low latency because not all frames depicting a gesture need to be received and analyzed. The speed of the gesture detection device may consume 0.19 MS per frame.

Figure 3:
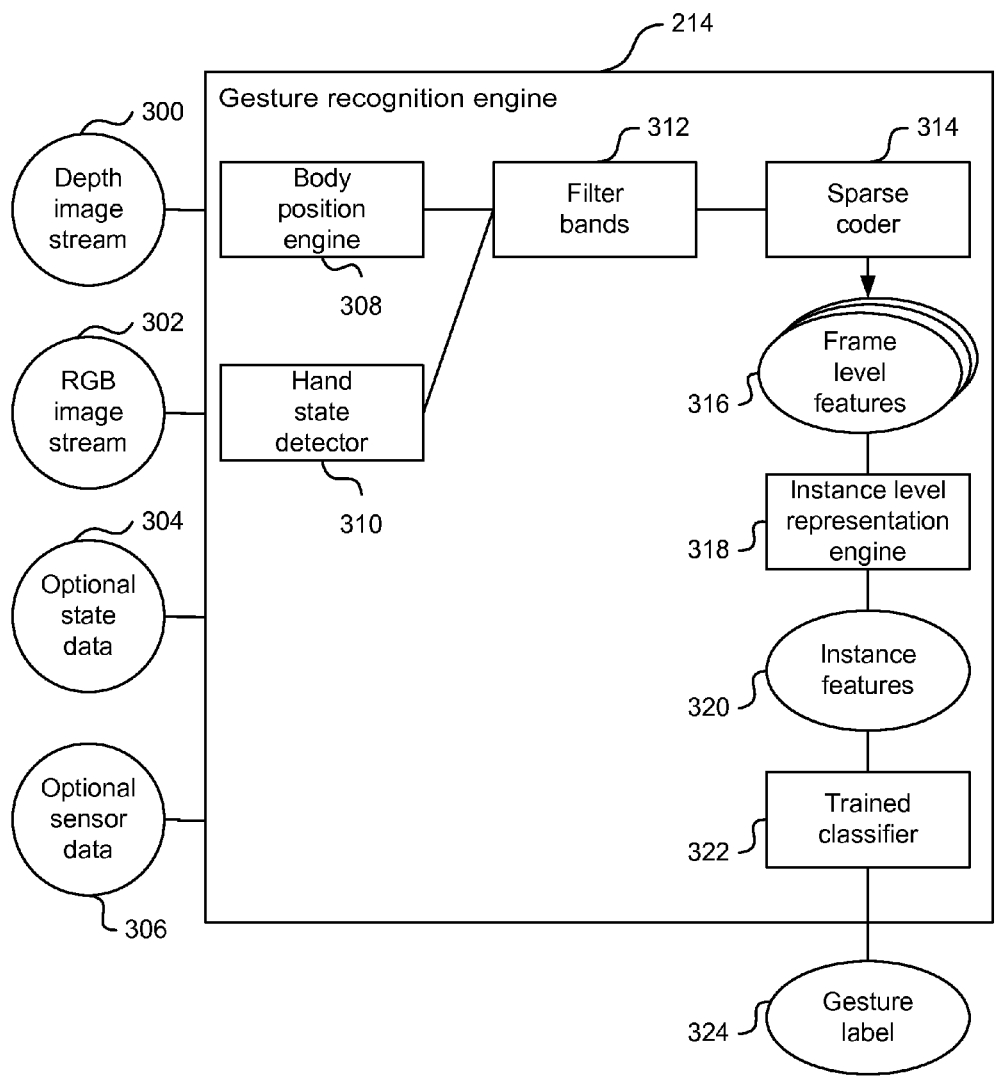
FIG. 3 is a schematic diagram of the gesture recognition engine of FIG. 2 in more detail.

As illustrated in FIG. 3 the gesture recognition engine 214 uses a novel pipeline. That is, the trained classifier takes as input high level temporal features computed from body position features and body part state features. Raw image data from the image streams is not input to the classifier. The body position features and body part state features are already semantically meaningful and very compact and discriminative. Computing instance level features from a combination of both body position features and body part sate features has been found to give accurate, fast, gesture recognition results.

Figure 4:
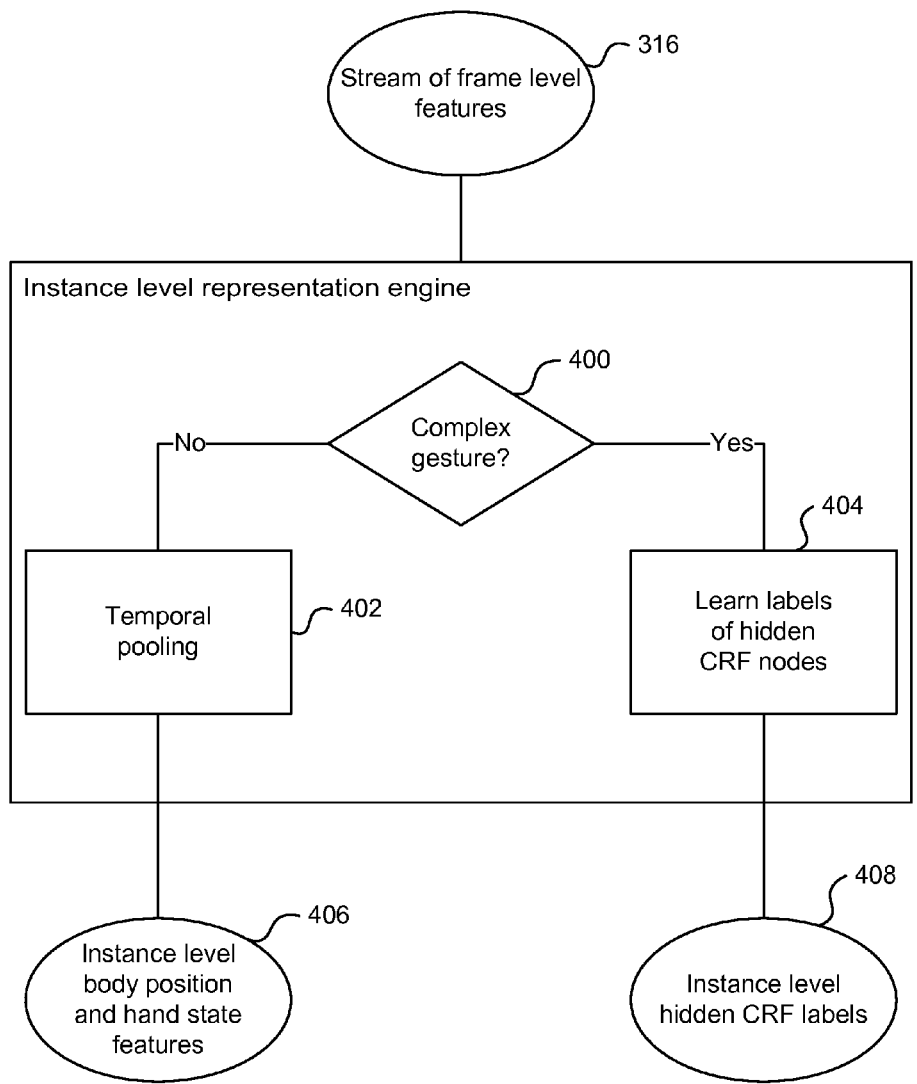
FIG. 4 is a schematic diagram of the instance level representation engine of FIG. 3 in more detail.

FIG. 4 is a schematic diagram of the instance level representation engine of FIG. 3 in more detail. The instance level representation engine 318 takes as input a stream of frame level features 316. The frame level features comprise body position features and body part articulation state features as described above. The stream comprises features computed from individual frames of a stream of frames as described above.

The instance level representation engine 318 optionally checks 400 whether a complex gesture is expected or not. For example, the instance level representation engine 318 may use system state data in the case that the gesture recognition system is used as part of a game system or other system. The game state data may indicate that a player of a golf game is expected to make a golf swing for example. The game state data may indicate that a player is about to make a complex dance gesture, for example, in response to a state of an avatar in the game. It is also possible for the instance level representation engine to cache a batch of frame level features and use rules or other criteria to check whether a complex gesture is likely or not.

If a complex gesture is expected the instance level representation engine 318 uses a graphical representation of temporal structure of a sequence of frame level features. For example, the graphical representation may comprise a hidden conditional random field. The instance level representation engine may learn 404 labels 408 of nodes of a hidden conditional random field as explained in more detail below.

If a simple gesture is expected the instance level representation engine 318 uses a temporal pooling 402 process to compute temporally pooled instance level body position and hand state features 406.

The arrangement of FIG. 4 may be modified such that both the temporal pooling 402 and graphical representations are computed in parallel for the stream of frame level features 316. The arrangement of FIG. 4 may be modified such that temporal pooling is computed and the graphical representation is not computed (or vice versa).

Figure 5:
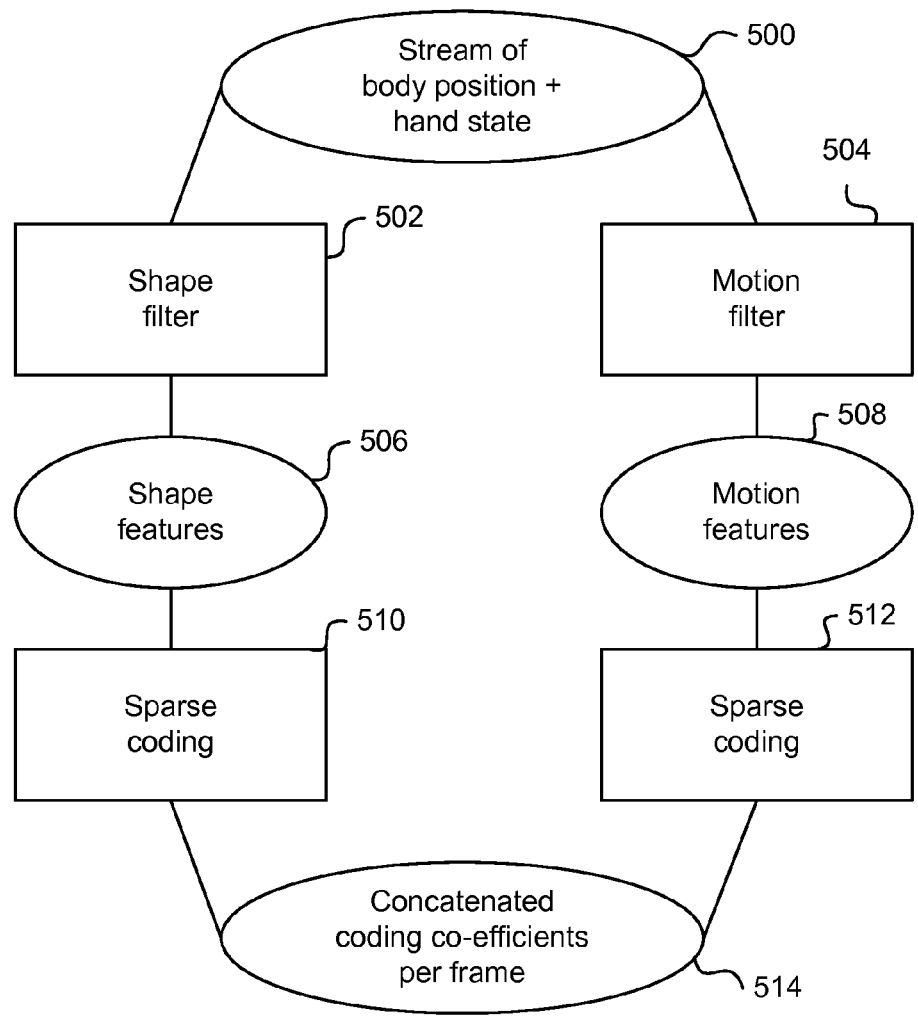
FIG. 5 is a flow diagram of process at the filter banks and sparse coder of FIG. 3.

FIG. 5 is a flow diagram of process at the filter banks and sparse coder of FIG. 3. To achieve robustness, instead of directly using the raw features extracted from the input signals, a sparse coding 512 is computed which produces coefficients that serve as the final frame-level representation.

The filter banks may comprise both a shape filter 502 and a motion filter 504. The shape filter 502 may be defined as the concatenated joint displacement vectors obtained by subtracting each joint position with the average position of all the joints at each frame. The motion filter 504 may be defined as the speed of each joint along the timing sequence (mimicking the optical flow).

Shape features 506 and motion features 508 output by the respective filters are further separately sent to sparse coding components 510, 512. The resulting coding coefficients may be concatenated 514 to form a final frame level representation.

Figure 6:
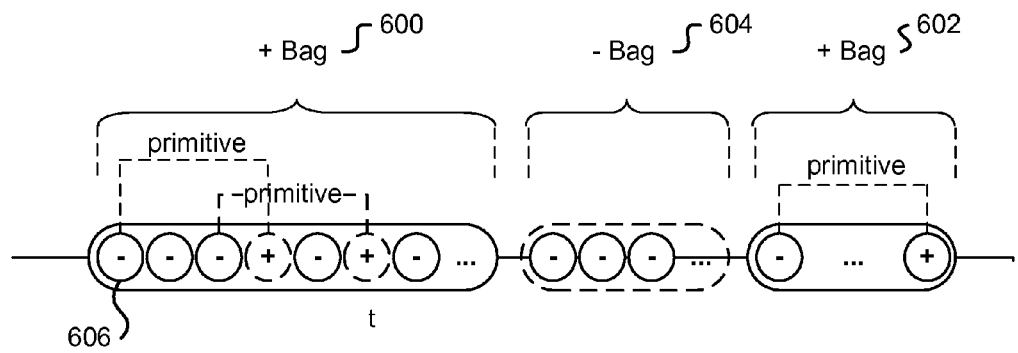
FIG. 6 is a schematic diagram of positive and negative bags of sequences of frames.

FIG. 6 is a schematic diagram of positive and negative bags of sequences of frames. An individual frame is depicted using a circle 606 in FIG. 6 and the position of the circles horizontally on the page indicates the chronological order of the frames. A first sequence of frames 600 has been labeled by a human as being a positive bag, that is, a sequence of frames where at least some of the frames in the bag depict a gesture of a particular class. A second sequence of frames 604 has been labeled by a human as being a negative bag. A third sequence of frames 602 has been labeled by a human as being a positive bag.

In this example, the first sequence of frames 600 has been found to contain two gesture primitives as indicated. Each gesture primitive comprises two frames in this example (one marked with a + and one marked with a −) as indicated by the dotted lines. The third sequence of frames 602 also comprises a primitive comprising two frames as indicated.

Figure 7:
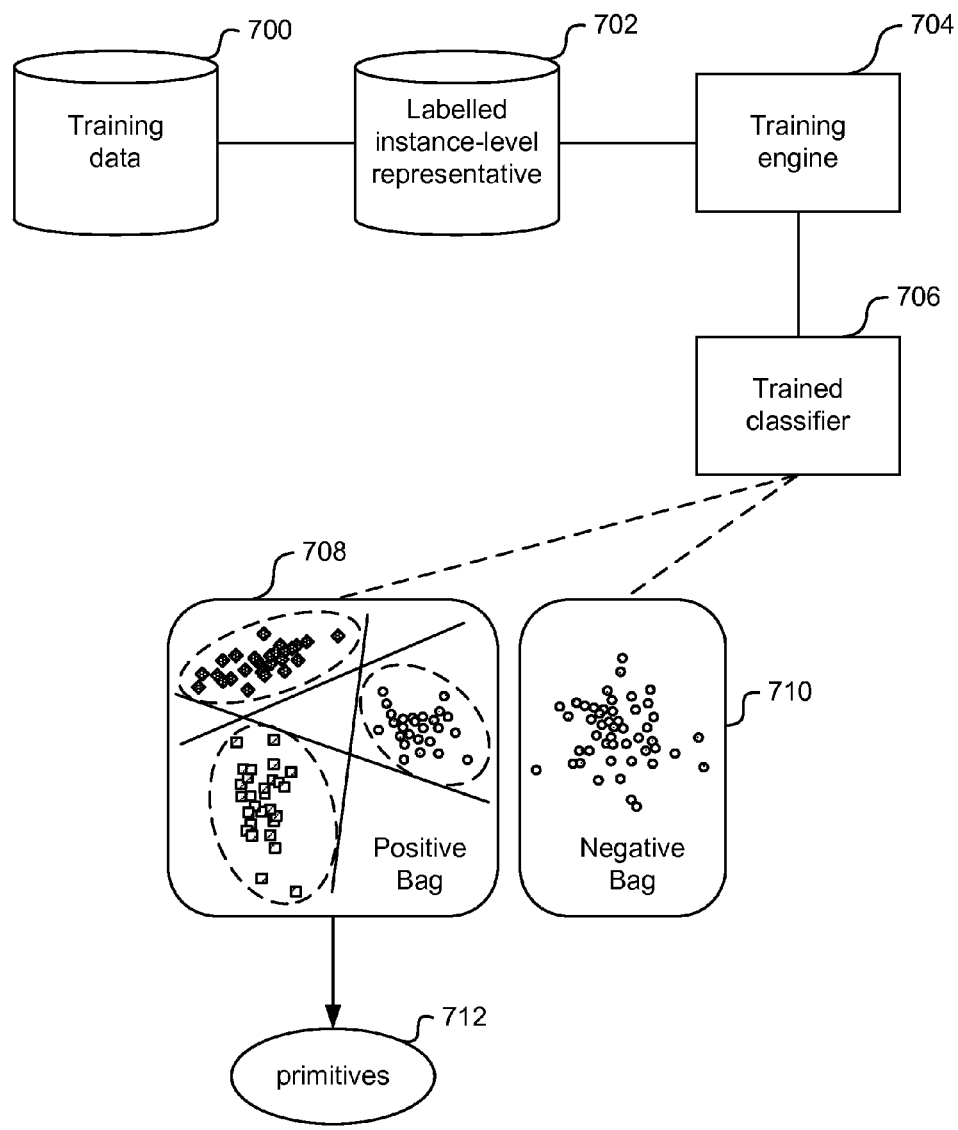
FIG. 7 is a schematic diagram of a training engine accessing training data to produce a trained classifier for classifying sequences of frames into gesture classes depicted in the sequences of frames.

FIG. 7 is a schematic diagram of a training engine 704 accessing training data 700 to produce a trained classifier 706 for classifying sequences of frames into gesture classes depicted in the sequences of frames. The trained classifier 706 may be a binary classifier which classifies an instance level representation computed from a sequence of frames, as being an example of a particular type of gesture or not (i.e. falling into the positive bag or the negative bag). Many of the trained classifiers 706 may be used, one for each type of gesture to be detected.

The training data 700 comprises sequences of frames labeled as positive or negative bags by human judges. The training data 700 is used to compute labeled instance-level features 702 using the process of FIG. 4 described above. A training engine uses the labeled training data to train a classifier such as a multiple decision boundary classifier to produce trained classifier 706. The training engine may use the supervised training process of FIG. 8.

Figure 8:
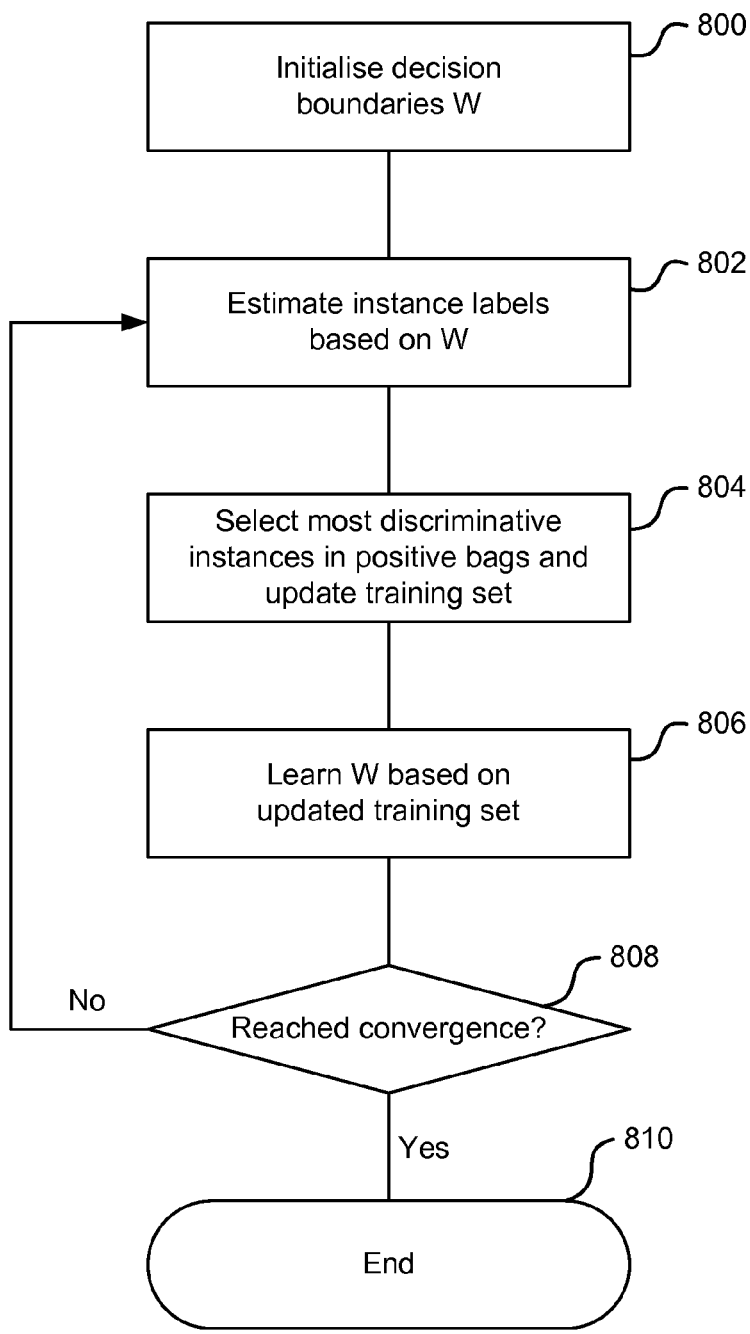
FIG. 8 is a flow diagram of a method used by the training engine of FIG. 7.

With reference to FIG. 8 the training engine initializes 800 a plurality of decision boundaries W in a multi-dimensional feature space of the instance level features. For example, the decision boundaries are set using preconfigured default decision boundaries or are selected at random. The decision boundaries divide the feature space into a plurality of regions, each region associated with a gesture primitive or a negative bag. The instance level features are plotted in the feature space and assigned estimated region labels 802 based on relative position of the instance level features and the decision boundaries. The most discriminative instance level features from the positive bag are selected 804 and used to update a training set of instance level features. The updated training set is used to update the decision boundaries W 806. If convergence is reached 808 the training process ends 810; otherwise the process repeats from step 802.

Figure 9:
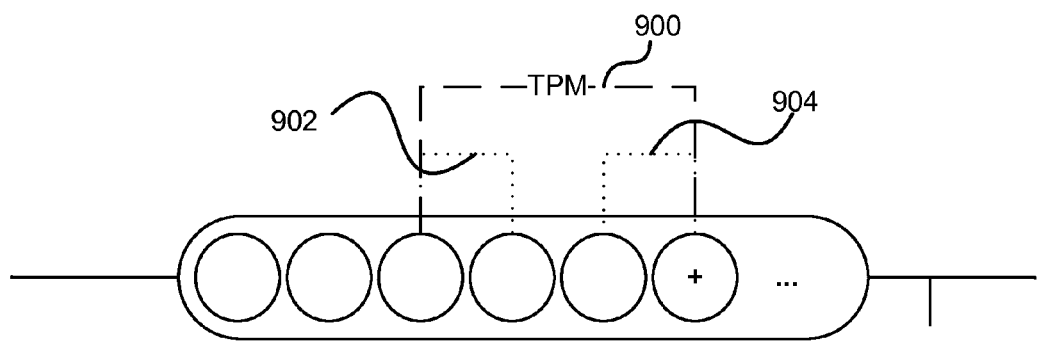
FIG. 9 is a schematic diagram of computing a temporally pooled representation of a sequence of frames.

FIG. 9 is a schematic diagram of computing a temporally pooled representation of a sequence of frames using a pyramid process. A pyramid process is one which computes values at a plurality of scales or resolutions. Individual frames are depicted as circles as in FIG. 6. In this example, features from two frames 902 are aggregated to give first level features. Features from a second two frames 904 are aggregated to give first level features. The first level features are then aggregated 900 to give second level features. The aggregation may comprise taking a maximum of the feature values or taking an average of the feature values. Other aggregation processes may be used. By using a temporal pyramid pooling process some degree of speed invariance is achieved. That is, a gesture of type 1 carried out slowly is detected as a gesture of type 1, as is a gesture of type 1 carried out in a fast manner. By using a temporal pyramid pooling process robustness to local noise is achieved.

Figure 10:
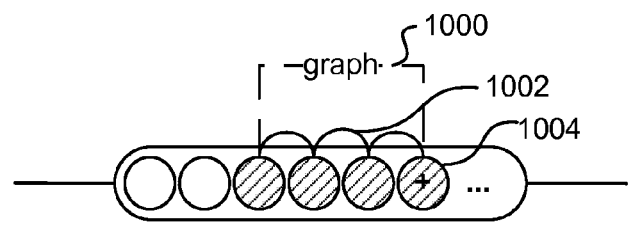
FIG. 10 is a schematic diagram of a graph comprising a sequence of frames.

FIG. 10 is a schematic diagram of a graph comprising a sequence of frames. As in FIG. 6 and FIG. 9 individual frames are depicted as circles. Each cross hatched circle 1004 depicts a node of a conditional random field. Edges between nodes in the conditional random field graph 1000 are depicted as curved lines 1002. Each node of the graph 1000 is assigned a hidden variable to form the conditional random field graph 1000 with the aim of representing a gesture primitive. A conditional random field (CRF) is a statistical model for predicting a label of a frame by taking into account the proceeding several frames of the current frame by connecting consecutive pairwise frames. The CRF is used to build the feature representation of the instance that ends with the current frame. The label values do not have semantic meaning and are latent (unobserved) variables learnt during the dynamic programming process described with respect to FIG. 11.

Figure 11:
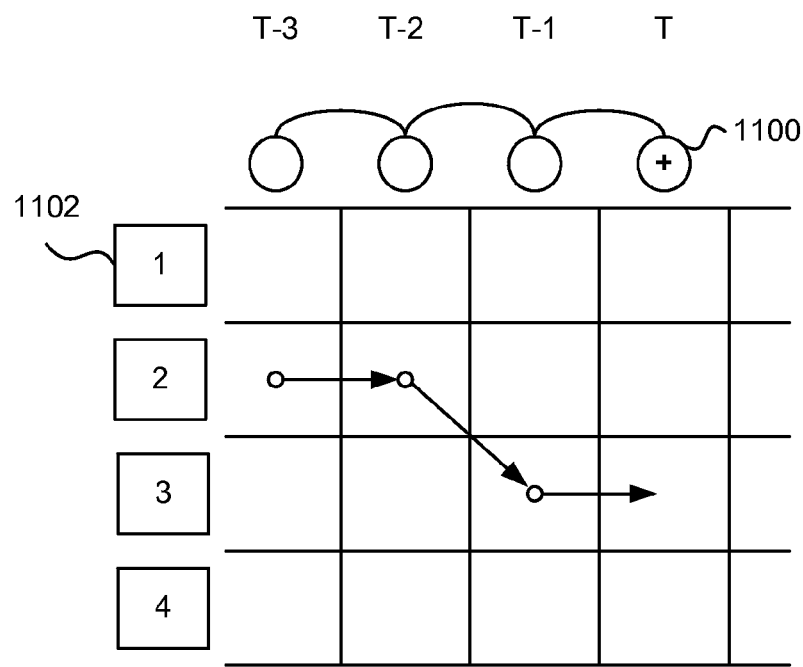
FIG. 11 is a schematic diagram of a dynamic programming process for labeling a graph such as the graph of FIG. 10.

To find the labels of the conditional random field graph dynamic programming is used. A cost matrix is formed as illustrated schematically in FIG. 11 as a grid of rows and columns. Columns of the graph represent time intervals of an input stream of frame level features. In this example a frame 1100 at time T is preceded by frames at times T−1, T−2 and T−3. Rows of the graph represent possible label values 1102 of nodes of the conditional random field graph. In this example there are four possible label values 1, 2, 3, 4. A minimum-cost path through the cost matrix 500 is computed to find the label value to assign to each time interval (i.e. frame). In the example of FIG. 11 the minimum cost path begins at column T−3 row 2 and moves to column T−2 row 2. It then moves to column T−1 row 3 and then to column T row 3. The size of the cost matrix 500 is determined by the number of hidden states of each node. By way of example, if there are 4 different hidden nodes, then the matrix would be 4×4, and each cell stores the minimum accumulated cost of an optimal path from (0, 0) to (i, j). The path may start at cell (0; 0) by the procedure of standard dynamic programming, and end at cell (|P|, |Q|), so that a mapping for all frames may be used. Three exemplary moves may be used to construct a path: a diagonal 45° move that indicates a label of the same type as the previous label is to be used, as well as horizontal and vertical moves that represent the CRF labeling.

In order to calculate the cost function of finding the optimal labeling the machine learning component may use the following equation: $h^t = \text{argmax}_h w^t \varphi(x, y, h)$ where the learned classifier model is denoted as w, and $\varphi(x, y, h)$ denotes the joint feature representation of the CRF, whereby $h(h_1 h_2 h_3 \ldots)$ represents the hidden labeling for the graphs.

Figure 12:
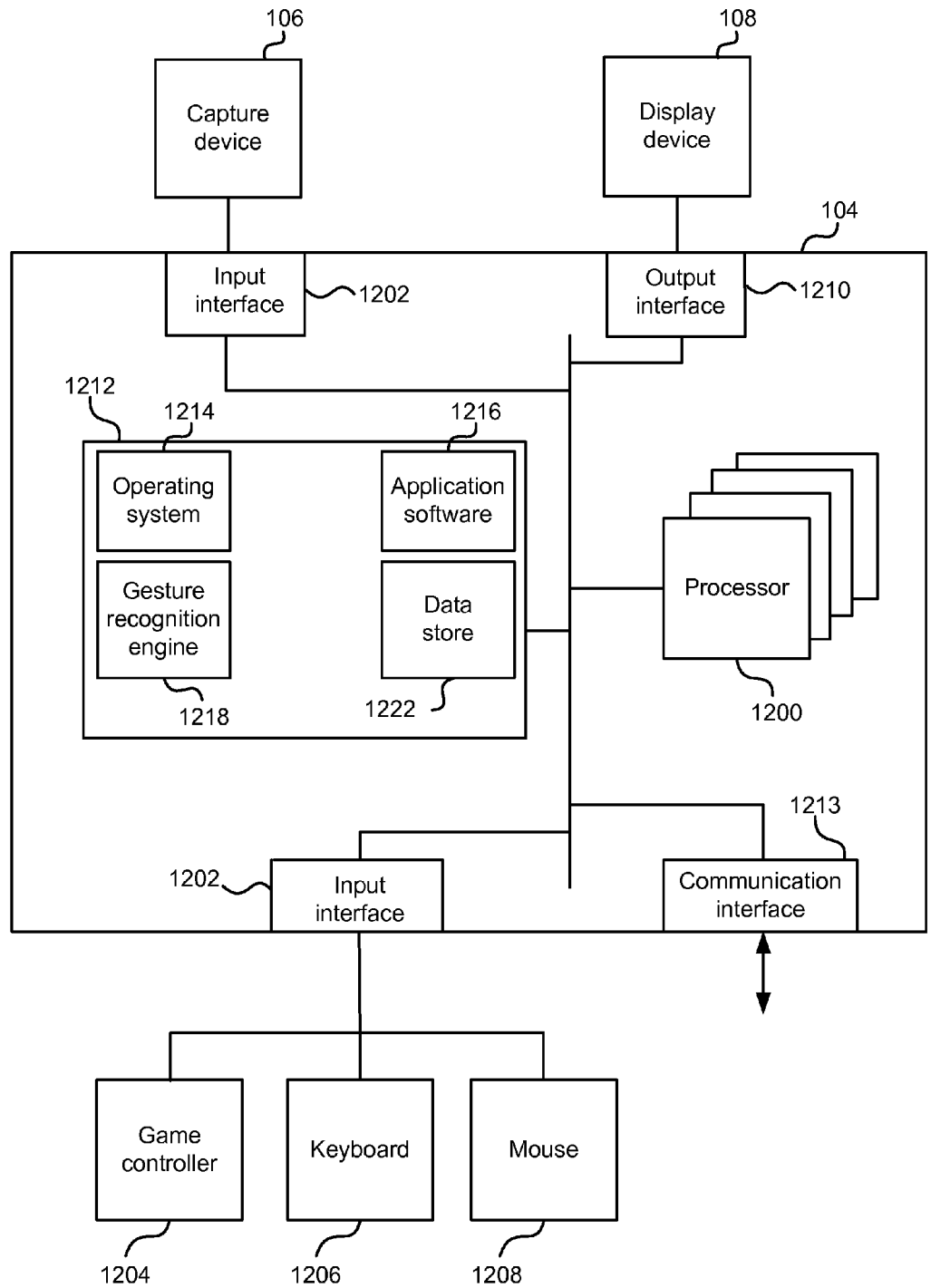
FIG. 12 illustrates an exemplary computing-based device in which embodiments of a gesture detection system may be implemented.

FIG. 12 illustrates various components of an exemplary computing-based device 104 which may be implemented as any form of a computing and/or electronic device, and in which embodiments of gesture recognition systems may be implemented.

Computing-based device 104 comprises one or more processors 1200 which may be microprocessors, controllers, graphics processing units, parallel processing units, or any other suitable type of processors for processing computing executable instructions to control the operation of the device in order to recognize gestures in streams of live input images. In some examples, for example where a system on a chip architecture is used, the processors 1700 may include one or more fixed function blocks (also referred to as accelerators) which implement a part of the method of joint positions prediction in hardware (rather than software or firmware).

The computing-based device 104 comprises one or more input interfaces 1202 arranged to receive and process input from one or more devices, such as user input devices (e.g. capture device 106, a game controller 1204, a keyboard 1206 and/or a mouse 1208). This user input may be used to control software applications or games executed on the computing device 104.

The computing-based device 104 also comprises an output interface 1210 arranged to output display information to a display device 108 which can be separate from or integral to the computing device 104. The display information may provide a graphical user interface. In an example, the display device 108 may also act as the user input device if it is a touch sensitive display device. The output interface may also output data to devices other than the display device, e.g. a locally connected printing device.

The computer executable instructions may be provided using any computer-readable media that is accessible by computing based device 104. Computer-readable media may include, for example, computer storage media 1212 such as memory and communications media. Computer storage media 1212, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media 1212 (memory) is shown within the computing-based device 104 it will be appreciated that the storage may be distributed or located remotely and accessed via a network or other communication link (e.g. using communication interface 1213).

Platform software comprising an operating system 1214 or any other suitable platform software may be provided at the computing device 104 to enable application software 1216 to be executed on the device. Other software that can be executed on the computing device 104 includes: gesture recognition engine 1218. A data store 1222 is provided to store data such as previously received depth images, frame level features, instance level features, classification parameters, and other data.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A gesture recognition method comprising:
receiving, at a processor, an input stream of image frames depicting an articulating entity;
computing instance level features from individual ones of the image frames and sending the computed features to a trained machine learning system; and
receiving in response at least one gesture class from a plurality of possible gesture classes;
wherein the trained machine learning system comprises at least one multiple decision boundary classifier comprising a plurality of decision boundaries arranged to divide an instance level feature space into a plurality of regions, at least one region being associated with a gesture primitive; and
wherein the instance level features are calculated from one or more instances where the instances are temporally non-sequential subsets of frames depicting a complete gesture of the gesture class made by the articulated entity.

2. The method of claim 1 where the instance level features computed from the individual ones of the frames comprise at least one gesture primitive of the gesture class.

3. The method of claim 1 comprising training the machine learning component to learn gesture primitives.

4. The method of claim 3 comprising learning the gesture primitives as latent variables of the machine learning component.

5. The method of claim 1 wherein computing the instance level features comprises receiving frame level features and computing the instance level features by aggregating the frame level features.

6. The method of claim 1 wherein computing the instance level features comprises receiving frame level features comprising one or more of: body part centroid position features, joint position features, surface normal directions associated with joint positions, body part articulation state features.

7. The method of claim 5 where the aggregation comprises a temporal pyramid pooling process being a hierarchical aggregation process.

8. The method of claim 5 where the aggregation comprises computing a graphical representation of temporal structure in the plurality of the frames.

9. The method of claim 5 where the aggregation comprises computing labels of a hidden conditional random field.

10. The method of claim 9 where the labels of the hidden conditional random field are computed by finding a least cost path through a cost matrix using dynamic programming.

11. The method of claim 1 where the trained machine learning component comprises a plurality of binary classifiers one for each of a plurality of gesture classes.

12. A gesture recognition method comprising:
receiving, at a processor, an input stream of image frames depicting an articulating entity;
computing instance level features from individual ones of the image frames by computing frame level features and aggregating at least some of the frame level features;
sending the computed instance level features to a trained machine learning system; and
receiving in response at least one gesture class from a plurality of possible gesture classes;
wherein the trained machine learning system comprises at least one multiple decision boundary classifier comprising a plurality of decision boundaries arranged to divide an instance level feature space into a plurality of regions, at least one region being associated with a gesture primitive; and wherein the instance level features are calculated from one or more instances where the instances include temporally non-sequential subsets of frames depicting a complete gesture of the gesture class made by the articulated entity.

13. A gesture recognition engine comprising:

a processor arranged to receive an input stream of image frames depicting an articulating entity;

an instance level representation engine arranged to compute instance level features from individual ones of the image frames and to send the computed features to a trained machine learning system; and the processor arranged to receive in response at least one gesture class from a plurality of possible gesture classes;

wherein the trained machine learning system comprises at least one multiple decision boundary classifier comprising a plurality of decision boundaries arranged to divide an instance level feature space into a plurality of regions, at least one region being associated with a gesture primitive; and wherein the instance level features are calculated from one or more instances where each instance is a temporally non-sequential subset of frames depicting a complete gesture of the gesture class made by the articulated entity.

14. The gesture recognition engine of claim 13 where the trained machine learning component is integral with the gesture recognition engine.

15. The gesture recognition engine of claim 13 comprising a body position engine arranged to compute body position features and a body part articulation state detector arranged to compute body part articulation state features.

16. The gesture recognition engine of claim 15 the instance level representation engine arranged to take at least some of the body position features and body part articulation state features as input.

17. The gesture recognition engine of claim 13 comprising an input receiving state data from a system controlled by a natural user interface of which the gesture recognition engine is a part.

18. The gesture recognition engine of claim 13 the instance level representation engine being at least partially implemented using hardware logic selected from any one or more of: a field-programmable gate array, a program-specific integrated circuit, a program-specific standard product, a system-on-a-chip, a complex programmable logic device, graphics processing unit.

19. The gesture recognition engine of claim 13 being at least partially implemented using hardware logic selected from any one or more of: a field-programmable gate array, a program-specific integrated circuit, a program-specific standard product, a system-on-a-chip, a complex programmable logic device, graphics processing unit.

20. The method of claim 1 wherein the trained machine learning system and the processor are integral with a gesture recognition engine.

* * * * *